(12) United States Patent (10) Patent No.: US 7,972,109 B2
Crall et al. (45) Date of Patent: Jul. 5, 2011

(54) METHODS AND APPARATUS FOR FABRICATING A FAN ASSEMBLY FOR USE WITH TURBINE ENGINES

(75) Inventors: David William Crall, Loveland, OH (US); Frank Worthoff, West Chester, OH (US); Daniel Edward Mollmann, Cincinnati, OH (US); Nicholas Joseph Kray, Cincinnati, OH (US); Max Farson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 792 days.

(21) Appl. No.: 11/646,826

(22) Filed: Dec. 28, 2006

(65) Prior Publication Data

US 2008/0159854 A1 Jul. 3, 2008

(51) Int. Cl.
*F01D 11/12* (2006.01)

(52) U.S. Cl. ............... 415/173.1; 415/173.4; 415/174.4; 415/220; 416/2

(58) Field of Classification Search ........... 415/9, 173.1, 415/173.4, 174.4, 220; 60/39.091; 416/2
See application file for complete search history.

(56) References Cited

U.S. PATENT DOCUMENTS

| 899,319 | A | * | 9/1908 | Parsons et al. | ............. 415/173.5 |
|---|---|---|---|---|---|
| 3,339,933 | A | * | 9/1967 | Foster | ............. 277/415 |
| 4,534,698 | A | * | 8/1985 | Tomich | ............. 415/9 |
| 5,375,978 | A | * | 12/1994 | Evans et al. | ............. 416/230 |
| 5,628,622 | A | * | 5/1997 | Thore et al. | ............. 416/241 R |
| 5,836,744 | A |  | 11/1998 | Zipps et al. |  |
| 6,149,380 | A | * | 11/2000 | Kuzniar et al. | ............. 415/9 |
| 6,290,455 | B1 | * | 9/2001 | Hemmelgarn et al. | ............. 415/9 |
| 6,454,529 | B1 |  | 9/2002 | Zearbaugh et al. |  |
| 6,637,186 | B1 |  | 10/2003 | Van Duyn |  |
| 6,832,890 | B2 | * | 12/2004 | Booth | ............. 415/173.1 |
| 7,094,029 | B2 |  | 8/2006 | Taylor et al. |  |
| 7,094,033 | B2 |  | 8/2006 | Pauley et al. |  |
| 7,144,221 | B2 |  | 12/2006 | Giffin |  |
| 7,165,937 | B2 |  | 1/2007 | Dong et al. |  |

* cited by examiner

*Primary Examiner* — Ninh H Nguyen
(74) *Attorney, Agent, or Firm* — William Scott Andes, Esq.; Armstrong Teasdale LLP

(57) ABSTRACT

A method for fabricating a fan assembly is provided, wherein the method includes providing a rotor having a plurality of rotor blades. At least one rotor blade is fabricated from a frangible material. The method also includes coupling a casing substantially circumferentially about the rotor, and positioning the casing a distance from the plurality of rotor blades. The distance is selected to facilitate increasing an amount of initial resistance created between the casing and the plurality of rotor blades after a bladeout.

20 Claims, 3 Drawing Sheets

METHODS AND APPARATUS FOR FABRICATING A FAN ASSEMBLY FOR USE WITH TURBINE ENGINES

BACKGROUND OF THE INVENTION

This invention relates generally to turbine engines and, more particularly, to methods and apparatus for fabricating a fan assembly for use with a turbine engine.

At least some known turbine engines include a fan assembly that channels air to a compressor. Known fan assemblies include a plurality of fan blades that extend radially outward from a rotor shaft. The rotor shaft has an axis of rotation that passes through a center of gravity of the fan assembly. During normal operations, the rotor rotates about the axis of rotation within an orbiting diameter. Generally, the orbiting diameter is configured to be minimized during normal engine operations.

During operation of the engine, a fragment of a fan blade may become separated from the remainder of the blade and/or the blade may become separated from the rotor. This is commonly referred to as a "bladeout". When such damage occurs, a substantial rotary unbalance load may be created within the damaged fan assembly that may cause the orbiting diameter of the rotor to increase. As a result, the remaining intact fan blades may contact the surrounding fan assembly casing, which, over time, may cause damage to such blades and/or the casing.

At least some known fan assemblies include a filler material that is applied to the fan casing. The filler material facilitates reducing a gap defined between the tips of the fan blades and the fan casing. Known filler materials are typically made from a composite material that erodes when contacted by a fan blade. Accordingly, during a bladeout, at least one fan blade may cause the filler material to erode, such that a sufficient gap is defined between the remaining fan blades and the casing. The increased gap facilitates accommodating the increased orbiting diameter of the rotor. By freely accommodating the orbiting of the rotor, the rotary unbalance forces transmitted to the rest of the engine are reduced. However, at least some known filler materials increase the overall weight of the engine enough that the filler material weight may actually decrease engine efficiency and/or increase costs associated with engine fabrication, assembly, and/or maintenance.

BRIEF DESCRIPTION OF THE INVENTION

In one aspect, a method for fabricating a fan assembly is provided, wherein the method includes providing a rotor having a plurality of rotor blades. At least one rotor blade is fabricated from a frangible material. The method also includes coupling a casing substantially circumferentially about the rotor, and positioning the casing a distance from the plurality of rotor blades. The distance is selected to facilitate increasing an amount of initial resistance created between the casing and the plurality of rotor blades after a bladeout.

In a further aspect, a fan assembly includes a rotor including a plurality of rotor blades. At least one rotor blade is fabricated from a frangible material. The fan assembly also includes a casing extending circumferentially about the rotor. The casing is positioned a pre-selected distance from the plurality of rotor blades. The distance facilitates increasing an amount of initial resistance created between the casing and the plurality of rotor blades after a bladeout.

In another aspect, a turbine engine includes a fan assembly configured to channel air to a compressor. The fan assembly includes a rotor including a plurality of rotor blades. At least one rotor blade is fabricated from a frangible material. The fan assembly also includes a casing extending circumferentially about the rotor. The casing is positioned a pre-selected distance from the plurality of rotor blades. The distance facilitates increasing an amount of initial resistance created between the casing and the plurality of rotor blades after a bladeout to facilitate eroding the at least one rotor blade fabricated from a frangible material when the at least one rotor blade contacts the casing after the bladeout.

DETAILED DESCRIPTION OF THE INVENTION

The present invention provides an exemplary method and system for fabricating a fan assembly for an engine. Specifically, in the exemplary embodiment, a fan assembly is provided that includes a rotor including a plurality of rotor blades, and a casing that is coupled circumferentially around the plurality of rotor blades. In the exemplary embodiment, the fan blades are fabricated from a frangible composite material. Moreover, in the exemplary embodiment, the casing is positioned a predetermined distance from the plurality of rotor blades, wherein the distance is selected to facilitate increasing a resistance between the casing and the plurality of rotor blades after a bladeout. Specifically, an increased initial resistance created between the casing and the fan blades causes erosion of the fan blades after a bladeout. The erosion of the fan blades facilitates reducing a radial rub force imparted by the fan blades on to the fan case and allows the rotor to orbit at a substantially larger orbit diameter. As used herein, the term "bladeout" refers to the separation of a fragment of a fan blade and/or the separation of a blade from the rotor during engine operation.

Moreover, the present invention provides a filler material that is applied to the fan casing. More specifically, an amount of filler material applied to the casing is reduced, in comparison to an amount used with known fan assemblies. As such, the exemplary embodiments provide a filler material that creates a greater resistance between the fan casing and the fan blade. Further, the reduced amount of filler material facilitates reducing an overall weight of the fan assembly and, therefore, reducing an overall weight of the engine.

Although the present invention is described below in reference to its application in connection with the turbine engine shown in FIG. 1, it should be apparent to those skilled in the art and guided by the teachings herein provided that with appropriate modification, the system and methods of the present invention can also be suitable for any engine capable of operating as described herein, including, for example, a steam turbine engine.

Moreover, although the present invention is described below in reference to its application in connection with fan assemblies, it should be apparent to those skilled in the art and guided by the teachings herein provided that, with appropriate modification, the system and methods of the present invention can also be suitable for use with any assembly having a rotor.

Figure 1:
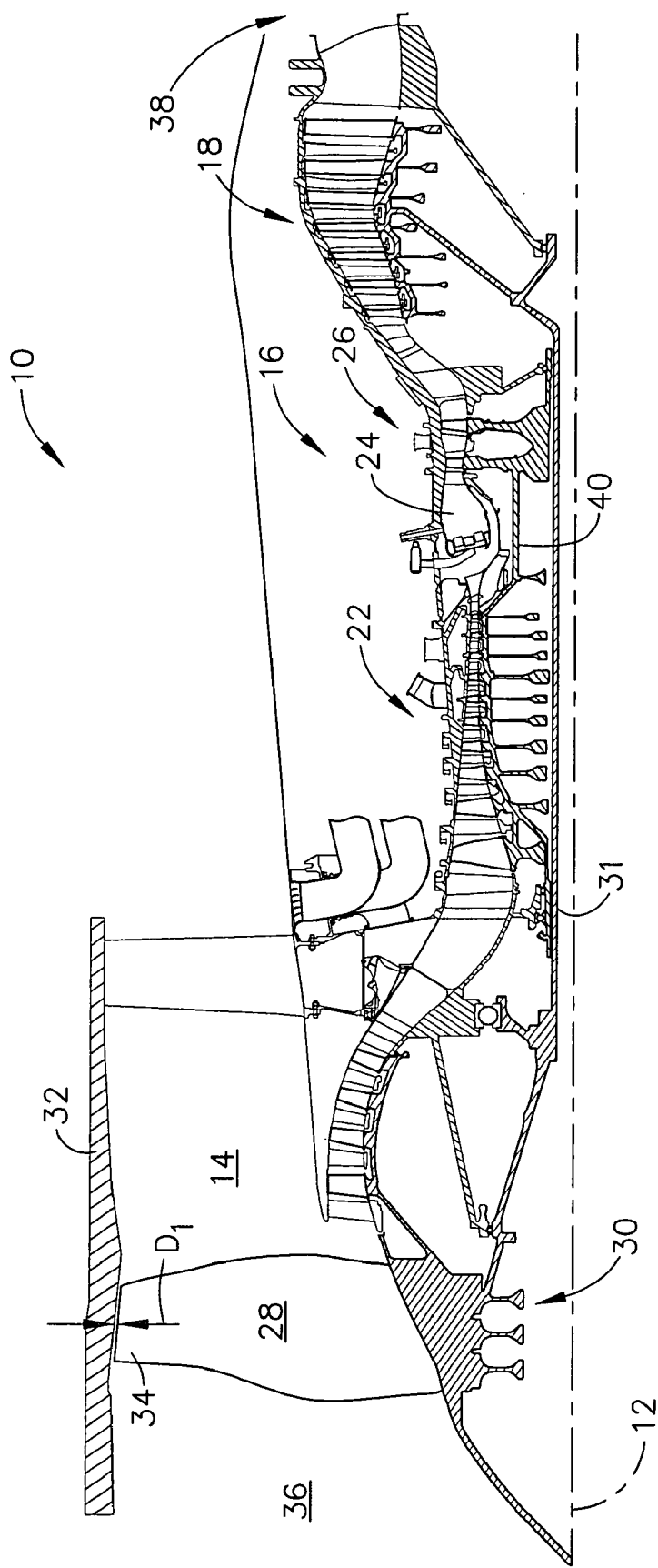
FIG. 1 is a schematic illustration of an exemplary turbine engine.

FIG. 1 is a schematic illustration of an exemplary engine assembly 10 having a longitudinal axis 12. Engine assembly 10 includes a fan assembly 14, a core gas turbine engine 16 that is disposed downstream from fan assembly 14, and a low-pressure turbine 18 that is disposed downstream from core gas turbine engine 16. Core gas turbine engine 16 includes a high-pressure compressor 22, a combustor 24, and a high-pressure turbine 26.

Fan assembly 14 includes a plurality of fan blades 28 that extend radially outward from a rotor disk 30 of a rotor 31, and a fan casing 32 that extends circumferentially about fan blades 28. A tip 34 of each fan blade 28 is positioned a radial distance $D_1$ from fan casing 32. In the exemplary embodiment, distance $D_1$ is selected to facilitate reducing an amount of air that passes over tips 34, i.e. tip spillage. Engine assembly 10 has an intake side 36 and an exhaust side 38. Compressor 22 and high-pressure turbine 26 are coupled together by a second drive shaft 40.

Figure 2:
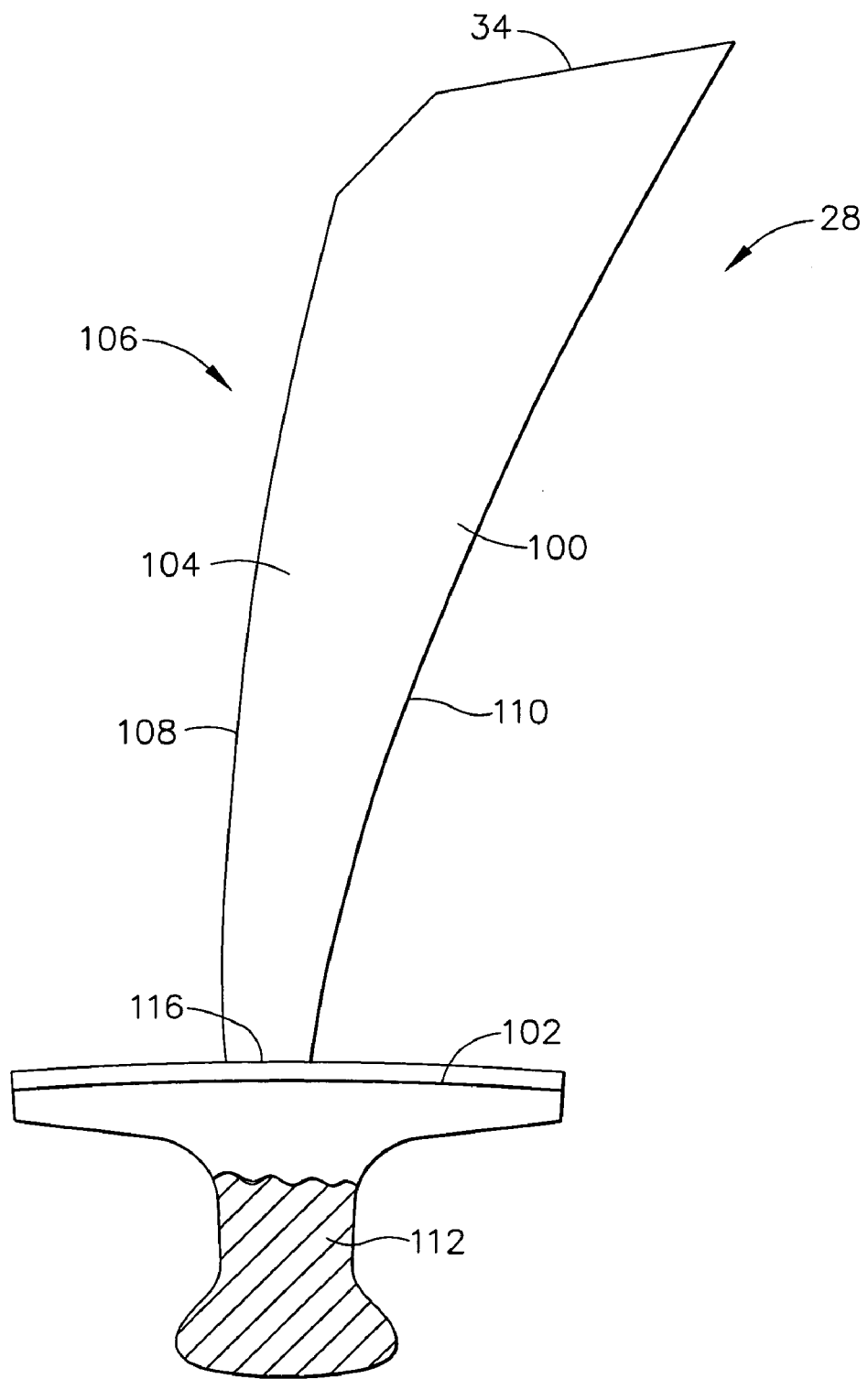
FIG. 2 is a side view of an exemplary fan blade that may be used with the engine shown in FIG. 1.

FIG. 2 is an exemplary embodiment of a fan blade 28. Fan blade 28 includes an airfoil 100 and an integral dovetail 102 that is used for mounting each fan blade 28 to a rotor disk, such as rotor disk 30 (shown in FIG. 1). Each fan blade 28 includes a first contoured sidewall 104 and a second contoured sidewall 106. In the exemplary embodiment, first sidewall 104 is convex and defines a suction side of fan blade 28, and second sidewall 106 is concave and defines a pressure side of fan blade 28. Sidewalls 104 and 106 are joined together at a leading edge 108 and at an axially-spaced trailing edge 110 of fan blade 28. More specifically, airfoil trailing edge 110 is spaced chordwise and downstream from airfoil leading edge 108. First and second sidewalls 104 and 106, respectively, extend longitudinally or radially outward in span from a blade root 112 positioned adjacent dovetail 102, to airfoil or blade tip 34. A dovetail platform 116 is positioned at blade root 112 and extends radially outward from first and second sidewalls 104 and 106, respectively. The general configuration of each fan blade 28 may take any conventional form, with or without platform 116 or dovetail 102. For example, fan blade 28 may be formed integrally with disk 30 in a blisk-type configuration that does not include dovetail 102.

In the exemplary embodiment, fan blade 28 is fabricated from a frangible composite material. The frangible composite material facilitates erosion of fan blade 28. Specifically, fan blade 28 is configured to erode if contacted by casing 32. As such, after a bladeout, a portion of remaining blades 28 extending from disk 30 may begin to erode. Specifically, after a bladeout, an unbalance of rotor 31 causes rotor disk 30 to rotate with a greater orbiting diameter in comparison to normal operating conditions. The greater orbiting diameter may cause intact blades 28 extending from rotor disk 30 to contact fan casing 32. Resultantly, a resistance between the intact blades 28 and fan casing 32 may cause erosion of fan blade tips 34.

During normal engine operations, rotor disk 30 rotates within an orbiting diameter that is substantially smaller than after a bladeout, and is centered about longitudinal axis 12. Accordingly, fan blades 28 rotate about longitudinal axis 12, while maintaining distance $D_1$ from fan casing 32 with the exception of minor variations due to small engine 10 imbalances. Distance $D_1$ facilitates substantially reducing an amount of air that may be channeled past tips 34 during engine operation. As such, an amount of air channeled to compressor 22 is facilitated to be increased.

In the event that a foreign object impacts at least one fan blade 28, fan blade 28 may be damaged and a bladeout event may occur. Typically, a bladeout event initiates an engine shutdown sequence. Moreover, in such an event, an imbalance of engine 10 will likely be induced such that rotor 31 deflects out of orbit causing an increase in the orbiting diameter of rotor disk 30. Such a deflection may be of sufficient magnitude to facilitate at least one other blade on the opposite side of the rotor from the initial release blade, 28 to impact casing 32 and lose material, thereby reducing the net unbalance. Specifically, a resistance created between fan casing 32 and the blade 28 is initially increased. Because blades 28 are fabricated from a frangible material, blades 28 are facilitated to erode more quickly and reduce the resulting radial load by effectively increasing distance $D_1$ by erosion of the blade tips.

Figure 3:
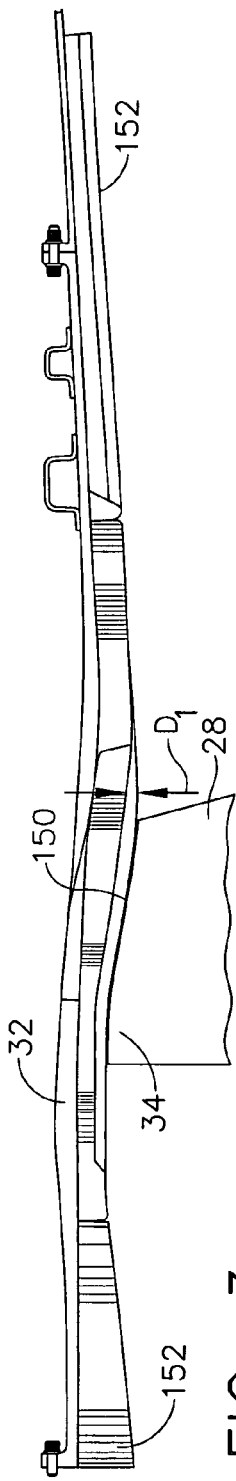
FIG. 3 is an enlarged schematic view of a portion of an exemplary fan casing that may be used with the engine shown in FIG. 1.
Figure 4:
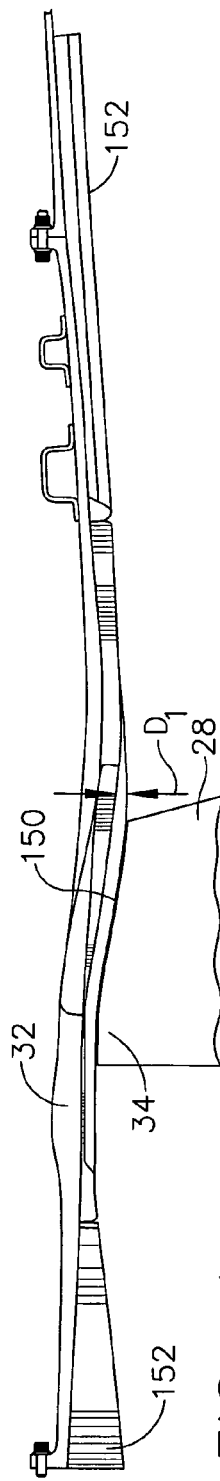
FIG. 4 is an enlarged schematic view of an alternative embodiment of the fan casing shown in FIG. 3.
Figure 5:
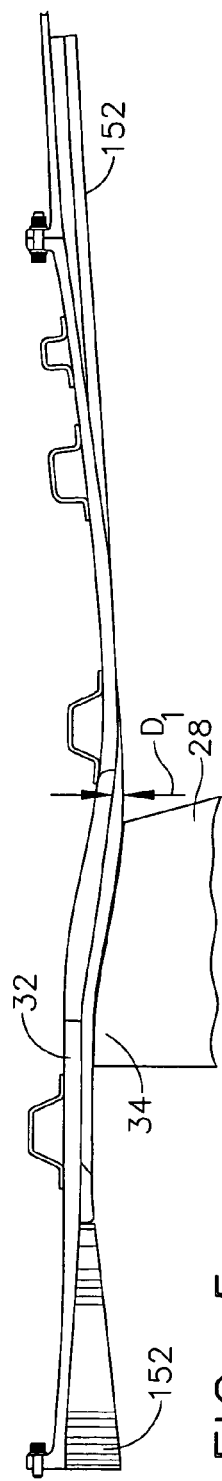
FIG. 5 is an enlarged schematic view of another alternative embodiment of the fan casing shown in FIG. 3.

Further, in the exemplary embodiment casing 32 is oriented to initially increase the resistance between intact fan blades 28 and casing 32. Specifically, FIG. 3 is a view of a fan casing 32 including a filler material 150. FIG. 4 is a view of an alternative embodiment of fan casing 32 including filler material 150. FIG. 5 is a view of fan casing 32 having no filler material 150.

Referring to FIGS. 3 and 4, a filler material 150 is applied to casing 32 to enable fan assembly 14 to accommodate a greater rotor orbiting diameter after a bladeout. Specifically, filler material 150 is fabricated from a frangible material that erodes when in contact with a fan blade 28. As such, during normal engine operations, filler material 150 facilitates reducing the distance $D_1$ between the tips 34 of fan blades 28 and casing 32, such that air flow through fan blades 28 is facilitated to be increased. Moreover, during a bladeout, filler material 150 erodes when contacted by fan blades 28 to facilitate accommodating for the increased orbiting diameter of the rotor. In one embodiment, filler material 150 is a honeycomb adhesively bonded to casing 32. In another embodiment, filler material is fabricated from at least one of a composite and aluminum. In an alternative embodiment, filler material is any material capable of functioning, as described herein.

In the exemplary embodiment, an amount of filler material 150 applied to casing 32 is reduced, in comparison to known fan assemblies. Specifically, the reduced amount of filler material 150 enables casing 32 to be positioned in closer proximity to fan blades 28 than is generally possible with known fan assemblies. More specifically, the distance $D_1$ defined between fan casing 32 and fan blades 28 is reduced, in comparison to known fan assemblies. As such, in one embodiment, during a bladeout, intact fan blades 28 erode filler material 150 and contact casing 32. Resultantly, casing 32 resists the rotation of fan blades 28, such that fan blades 28 are eroded, as described above. In addition, in the exemplary embodiment, the reduced amount of filler material 150 also facilitates reducing damping within filler material 150. The reduced damping of filler material 150 facilitates increasing the resistance created between casing 32 and fan blades 28 to a level of resistance that is substantially equivalent to the resistance created by casing 32 when fan blades 28 contact casing 32. Accordingly, the resistance of filler material 150 facilitates the erosion of fan blades 28, as described above.

Referring to FIG. 5, in one embodiment, casing 32 does not include filler material 150. Rather, casing 32 is positioned at a distance $D_1$ that facilitates fan assembly 14 operating under normal engine operating conditions, but during a bladeout, the distance $D_1$ causes contact between casing 32 and intact fan blades 28. In such an embodiment, casing 32 resists fan blades 28 causing erosion of fan blades 28, as described above.

While the action described above facilitates sacrificial erosion of fan blades 28, increasing the range of deflection of rotor 31 facilitates decreasing loads on the engine mounts (not shown). Furthermore, erosion of portions of fan blades 28 causes a reduction in the weight of fan blades 28 and facilitates a reduction of the imbalance while engine 10 shuts down, thereby decreasing a potential for further damage to casing 28.

In addition, the fan casings 32 described in FIGS. 3-5 facilitate reducing a weight of fan assembly 14, in comparison to known fan assemblies. Specifically, in the exemplary embodiments described in FIGS. 3 and 4, a weight of fan assembly 14 is reduced between approximately twenty-one pounds and approximately seventy pounds, in comparison to known fan assemblies. Further, the exemplary embodiments described in FIGS. 3 and 4 enable less acoustic panels 152 to be used, such that a weight of fan assembly 14 is further reduced between approximately six pounds and approximately eleven pounds, in comparison to known fan assemblies. As such, the exemplary embodiments described in FIGS. 3 and 4 facilitate reducing a weight of engine 10 between approximately twenty-seven pounds and approximately eighty-one pounds, in comparison to known fan assemblies.

The exemplary embodiment described in FIG. 5 facilitates reducing a weight of fan assembly 14 by approximately ninety-four pounds, in comparison to known fan assemblies which include filler material. Further, the embodiment described in FIG. 5 also enables less acoustic panels to be used, such that a weight of fan assembly 14 is further reduced by approximately eighteen pounds, in comparison to known fan assemblies. As such, the exemplary embodiment described in FIG. 5 facilitates reducing a weight of engine 10 by approximately one hundred twelve pounds, in comparison to known fan assemblies.

Accordingly, the exemplary embodiments of fan casing 32 described in FIGS. 3-5 facilitate reducing an overall weight of engine 10 in comparison to known engines. As such, the described embodiments facilitate increasing an efficiency of engine 10 in comparison to known engines. Moreover, the described embodiments facilitate decreasing costs associated with fabrication, assembly, and/or maintenance of engine 10.

In one embodiment, a method for fabricating a fan assembly is provided, wherein the method includes providing a rotor having a plurality of rotor blades. At least one rotor blade is fabricated from a frangible material. The method also includes coupling a casing substantially circumferentially about the rotor, and positioning the casing a distance from the plurality of rotor blades. The distance is selected to facilitate increasing an amount of initial resistance created between the casing and the plurality of rotor blades after a bladeout.

The present invention provides a method and system for accommodating an increased rotor orbiting diameter. Specifically, by increasing an initial resistance of the casing to the frangible blades, the frangible blades are enabled to erode thereby providing a sufficient distance between the blades and the casing. Moreover, by reducing a weight of filler material, an overall weight of engine 10 is reduced. Accordingly, an operating efficiency of an aircraft is facilitated to be increased. In addition, costs associated with fabricating, assembling, and/or maintaining engine 10 are facilitated to be reduced.

The benefits described in the exemplary embodiments above are exemplary only. Accordingly, it should be apparent to those skilled in the art and guided by the teachings herein provided that the systems and methods of the present invention may provide benefits beyond those described herein.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

While the invention has been described in terms of various specific embodiments, those skilled in the art will recognize that the invention can be practiced with modification within the spirit and scope of the claims.

What is claimed is:

1. A method for fabricating a fan assembly, said method comprising:
    providing a rotor having a plurality of rotor blades, wherein each of the rotor blades is fabricated from a frangible composite material;
    coupling a casing substantially circumferentially about the rotor;
    defining a first thickness of a filler material to be applied to the casing, the first thickness defines a first distance between a plurality of rotor blades fabricated from a non-frangible material and the filler material, wherein the first distance defines a first resistance between the plurality of rotor blades fabricated from the non-frangible material and the filler material; and
    applying filler material to the casing, the filler material having a second thickness less than the first thickness, the second thickness defining a second distance between the rotor blades and the filler material, the second distance less than the first distance, the second distance defines a second resistance between the plurality of rotor blades fabricated from the frangible composite material and the filler material, the second resistance greater than the first resistance.

2. A method in accordance with claim 1 further comprising positioning the casing to facilitate maintaining a rotor orbiting diameter after a bladeout without transmitting loads to the casing.

3. A method in accordance with claim 1 wherein providing a plurality of rotor blades fabricated from the frangible composite material is configured to erode when contacting the casing after a bladeout.

4. A method in accordance with claim 1 wherein applying filler material to the casing, comprises applying filler material configured to erode when contacted by the plurality of rotor blades after a bladeout.

5. A method in accordance with claim 1 wherein applying filler material to the casing, wherein comprises applying the filler material with a thickness that facilitates increasing the amount of resistance created between the casing and the plurality of rotor blades after a bladeout.

6. A method in accordance with claim 1 further comprising positioning the casing a distance from the plurality of rotor blades that facilitates reducing damage to the casing after a bladeout.

7. A method in accordance with claim 1 further comprising positioning the casing a distance from the plurality of rotor blades that facilitates reducing a weight of the fan assembly as a function of at least one of:
    decreasing the total weight of the filler material; and
    decreasing a number of acoustic panels within the fan assembly.

8. A fan assembly comprising:
a rotor comprising a plurality of first rotor blades, wherein at least one of said plurality of first rotor blades is fabricated from a frangible composite material;
a casing extending circumferentially about said rotor; and
a filler material applied to said casing, said filler material has a first thickness that defines a first distance between said at least one first rotor blade and said casing, the first distance defines a first resistance between said at least one first rotor blade and said casing, including said filler material, wherein the first thickness of said filler material is less than an estimated second thickness of filler material for a rotor including a plurality of second rotor blades, each of the plurality of second rotor blades fabricated from a non-frangible material, the estimated second thickness defines an estimated second distance between the plurality of second rotor blades and said casing, including said filler material, the estimated second distance defines a second resistance between each of the second rotor blades and said casing, including said filler material, the first distance is less than the estimated second distance, and the first resistance greater than the second resistance.

9. A fan assembly in accordance with claim 8 wherein the first distance from said casing to said plurality of first rotor blades is selected to facilitate maintaining a rotor orbiting diameter after a bladeout without transmitting loads to said casing.

10. A fan assembly in accordance with claim 8 wherein said at least one first rotor blade fabricated from a frangible composite material is configured to erode when contacting said casing after a bladeout.

11. A fan assembly in accordance with claim 8 wherein said filler material is configured to erode when contacted by said plurality of first rotor blades after a bladeout.

12. A fan assembly in accordance with claim 8 wherein said first distance from said casing to said plurality of first rotor blades is selected to facilitate reducing damage to said casing after a bladeout.

13. A fan assembly in accordance with claim 8 wherein said filler material first thickness facilitates increasing an amount of resistance created between said casing and said plurality of first rotor blades after a bladeout.

14. A fan assembly in accordance with claim 8 wherein said first distance from said casing to said plurality of first rotor blades is selected to facilitate reducing a weight of said fan assembly as a function of at least one of:
a reduced total weight of said filler material; and
a reduced number of acoustic panels within said fan assembly.

15. A turbine engine comprising:
a fan assembly configured to channel air to a compressor, said fan assembly comprising:
a rotor comprising a plurality of first rotor blades, wherein at least one of said plurality of first rotor blades is fabricated from a frangible composite material;
a casing extending circumferentially about said rotor; and
a filler material applied to said casing, said filler material has a first thickness that defines a first distance between said at least one first rotor blade and said casing, the first distance defines a first resistance between said at least one first rotor blade and said casing, including said filler material, wherein the first thickness of said filler material is less than an estimated second thickness of filler material for a rotor including a plurality of second rotor blades, each of the plurality of second rotor blades fabricated from a non-frangible material, the estimated second thickness defines an estimated second distance between the plurality of second rotor blades and said casing, including said filler material, the estimated second distance defines a second resistance between each of the second rotor blades and said casing, including said filler material, the first distance is less than the estimated second distance, and the first resistance greater than the second resistance.

16. A turbine engine in accordance with claim 15 wherein the first distance from said casing to said plurality of first rotor blades is selected to facilitate maintaining a rotor orbiting diameter after a bladeout without transmitting loads to said casing.

17. A turbine engine in accordance with claim 15 wherein said filler material is configured to erode when contacted by said plurality of first rotor blades after a bladeout.

18. A turbine engine in accordance with claim 15 wherein said first distance from said casing to said plurality of first rotor blades is selected to facilitate reducing damage to said casing after a bladeout.

19. A turbine engine in accordance with claim 15 wherein said filler material having a first thickness facilitates increasing an amount of resistance created between said casing and said plurality of first rotor blades after a bladeout.

20. A turbine engine in accordance with claim 15 wherein said first distance from said casing to said plurality of first rotor blades is selected to facilitate reducing a weight of said fan assembly as a function of at least one of:
a reduced total weight of said filler material; and
a reduced number of acoustic panels within said fan assembly.

* * * * *